United States Patent [19]
Lee et al.

[11] Patent Number: 5,612,740
[45] Date of Patent: Mar. 18, 1997

[54] INNER FOCUS TYPE ZOOM LENS DRIVING MECHANISM

[75] Inventors: Chung-Shing Lee, Tainan; Yih-Long Lin, Taipei, both of Taiwan

[73] Assignee: Industrial Technology Research Institute, Taiwan

[21] Appl. No.: 524,100

[22] Filed: Aug. 16, 1995

Related U.S. Application Data

[63] Continuation of Ser. No. 306,449, Sep. 19, 1994, abandoned.

[51] Int. Cl.⁶ .................................................. H04N 5/232
[52] U.S. Cl. ........................... 348/345; 348/349; 348/357
[58] Field of Search ..................................... 348/345, 350, 348/353, 347, 358, 335, 351, 357, 348; 354/400, 195.12

[56] References Cited

U.S. PATENT DOCUMENTS

| | | | |
|---|---|---|---|
| 4,598,989 | 7/1986 | Yamada et al. | 354/400 |
| 4,749,269 | 6/1988 | Nakashima et al. | 354/400 |
| 5,325,146 | 6/1994 | Toji | 348/353 |

*Primary Examiner*—Wendy Garber
*Attorney, Agent, or Firm*—Michael D. Bednarek; Kilpatrick & Cody

[57] ABSTRACT

A lens driving device comprising a permanent magnet fixed on one side of the lens barrel, the N and S poles of the magnet being arranged in the direction of the optical axis of the lens, a cylindrical moving coil concentric with and covering the cylindrical permanent magnet, a lens unit which is driven by the cylindrical moving coil under a focus control circuit from an image signal, and a position sensor that detects the lens position and provides feed back to the focus control circuit.

4 Claims, 4 Drawing Sheets

INNER FOCUS TYPE ZOOM LENS DRIVING MECHANISM

This application is a continuation of application Ser. No. 08/306,449 filed Sep. 19, 1994, now abandoned.

FIELD OF THE INVENTION

The present invention relates to a driving mechanism of a zoom lens, especially to a driving mechanism of an inner focus type zoom lens.

BACKGROUND OF THE INVENTION

A zoom lens is composed of movable zooming lens groups, movable focusing lens groups, and fixed lens groups. By moving the position of the focusing lens groups, an object can be focused at a certain position, like a film. By moving the position of the zooming lens groups, the size of the image of the object can be adjusted.

In photographic camera systems using charge-coupled devices (CCDs), there are usually two types of zoom lenses in driving the focusing lens groups, i.e., front focus type and inner focus type. In comparison with the front focus type, the inner focus type zoom lenses have higher accuracy and shorter stroke in focusing. Since the focusing lens groups are at rear end of the zoom lens in the inner focus type, the focusing lenses have smaller diameter and lower weight. Therefore, inner focus type is commonly used in camera systems.

Please refer to FIG. 1. A conventional driving mechanism of the zoom lens groups, as disclosed in U.S. Pat. No. 4,920,420, includes a fixed lens group 1, a zoom lens group 6, and a driving mechanism composed of a step motor 3, a reduction gear set 4 and a driving screw 5. The step motor 3 drives the driving screw 5 through the reduction gear set 4, then the zoom lens group 6 is driven by the driving screw 5. In the conventional driving mechanisms, a conversion mechanism, like the reduction gear set 4 and the driving screw 5 in this example, for converting the rotating motion of the motor into linear motion of the zoom lens groups is indispensable. However, the conversion mechanism also brings the problems of power loss and limitation of speed, therefore the focusing speed of the zoom lens is restricted by the driving mechanism. Furthermore, due to the backlash of the conversion mechanism, the accuracy of focusing is reduced, and sharp images cannot be achieved. In addition, the life of the conversion mechanism is reduced due to wear between each of the gears and the screw.

SUMMARY OF THE INVENTION

The object of the present invention is to provide a driving mechanism for focusing lens groups of an inner focus type zoom lens which has a higher focusing speed and a better focusing accuracy. In the mean time, the driving mechanism has a longer life and a compact structure.

The above objects are fulfilled by providing a driving mechanism for an inner focus type zoom lens using a CCD to receive an image of an object and generate an image signal. The driving mechanism comprises: a fixed portion including a frame, an iron fixed on the frame, a permanent magnet fixed at the center of the iron at one end of the permanent magnet, a pole piece fixed on the permanent magnet at the other end of the permanent magnet, and two linear bearings fixed on the frame, the pole piece and the iron forming a gap therebetween where the magnetic field of the magnet passes through; a movable portion including a lens socket to adapt a focusing lens group of the zoom lens, a coil socket fixed on the lens socket, and a coil sleeved on the coil socket, the lens socket having two holes sleeved on the linear bearings for maintaining the focusing lens group on the optical axis of the zoom lens, the coil socket surrounding the pole piece to maintain the coil to cut the magnetic field of the magnet; and a focusing circuit including a driver connected the coil for urging the coil by inducing a current in the coil, and a focus detecting circuit to receive the image from the CCD and decide whether the object is focused according to the contrast of the image, and to send a position control signal to the driver so as to urge the focusing lens groups to focus the object precisely on the CCD.

BRIEF DESCRIPTION OF THE DRAWING

The present invention will become more fully understood from the detailed description given hereinafter with reference to and the accompanying drawings which are given by way of illustration only, and thus are not limitative of the present invention and wherein.

DETAILED DESCRIPTION OF THE PREFERRED EMBODIMENT

Figure 1:
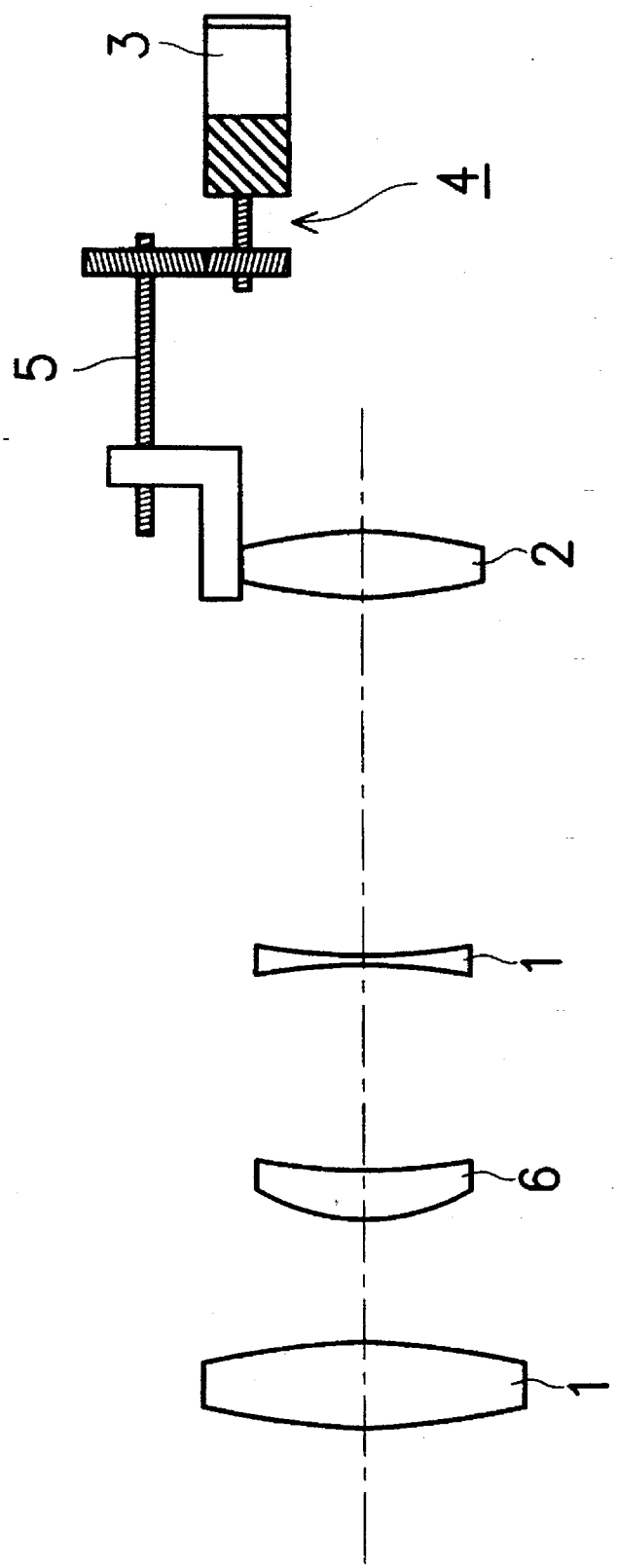
FIG. 1 shows a schematic diagram of the conventional driving mechanism.
Figure 2:
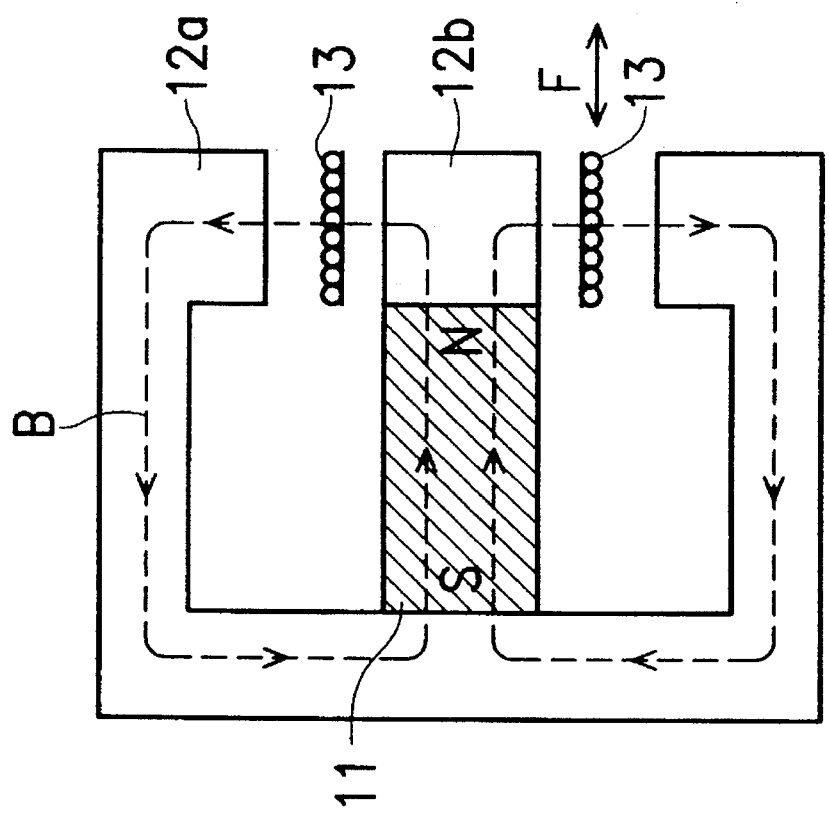
FIG. 2 shows a schematic diagram of a linear actuator used in a driving mechanism according to the present invention.

A simplified model is used to demonstrate the working principle of the present invention. As shown in FIG. 2, a linear actuator basically includes a permanent magnet 11, an iron 12a, a pole piece 12b, and a coil 13. Iron 12a and pole piece 12b together with magnet 11 form a complete magnetic path and a magnetic gap for the coil 13 to move therein. Magnetic field B is induced by the permanent magnet 11 crossing the coil 13. If there is a current in the coil 13, the interaction between the current and the magnetic field b will generate a force F on the coil 13, to urge the coil 13 to move in or out the magnetic field. The magnitude of the force F is proportional to the magnetic field B and the current. This force will be used to urge the focusing lenses in the embodiment stated hereinafter.

Figure 3A:
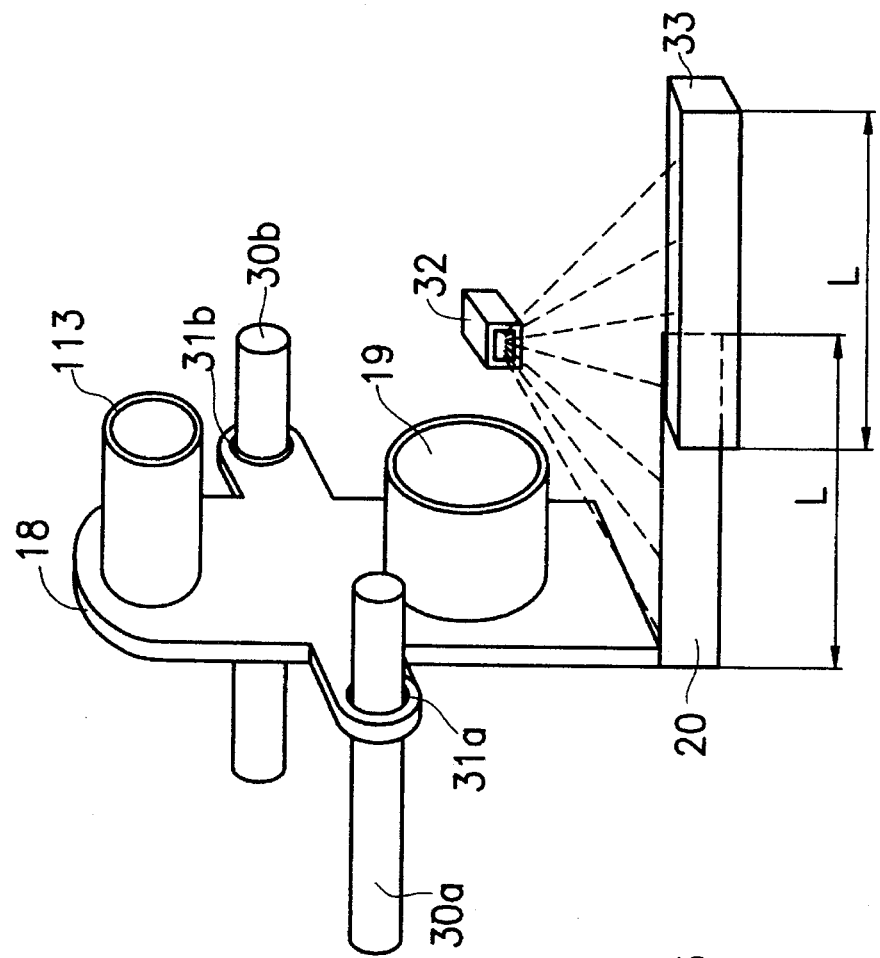
FIG. 3a shows a schematic diagram of a position sensor of the driving mechanism according to the present invention.
Figure 3:
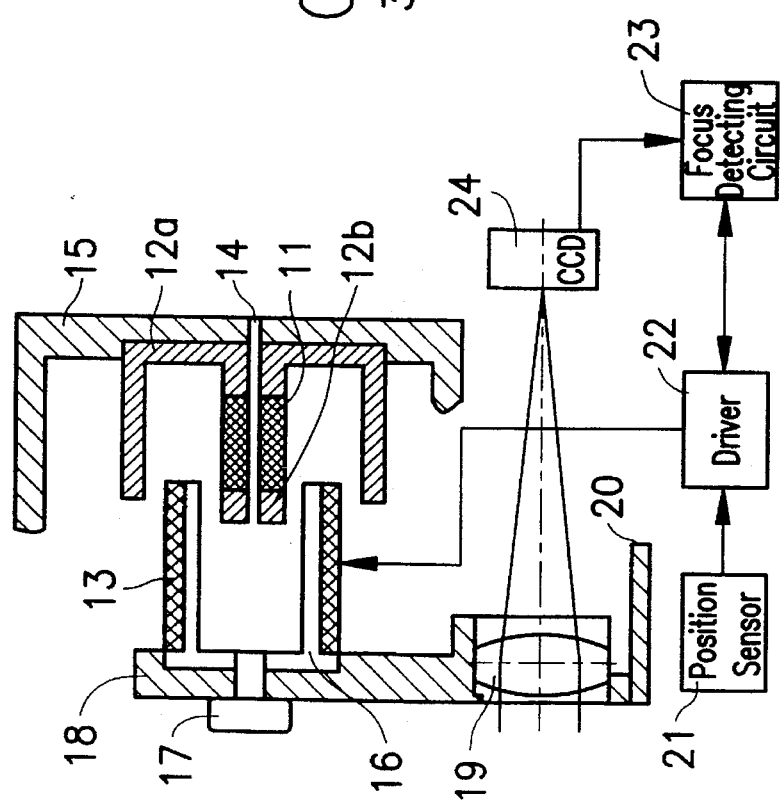
FIG. 3 shows a schematic diagram of the driving mechanism according to the present invention.

FIG. 3 shows an embodiment of the present invention. A driving mechanism contains a fixed portion, a movable portion, and a focusing circuit. The fixed portion includes a frame 15, an iron 12a, a permanent magnet 11, a pole piece 12b, a bolt 14 to fix the iron 12a, the magnet 11 and the pole piece 12b on the frame 15, and two linear bearings 30a and 30b fixed on the frame 15 which are shown in FIG. 3a. A gap is formed between the pole piece 12b and the iron 12a where the magnetic field of the magnet 11 passes through.

The movable portion includes a lens socket 18, a coil socket 16 fixed on the lens socket 18 via a screw 17, and a coil 13 sleeved on the coil socket 16. The coil socket 16 surrounds the pole piece 12b, so that the coil 13 cuts the magnetic field of the magnet 11. The focusing lens groups 19 are fixed on the lens socket 18. As shown in FIG. 3a, the lens socket 18 has two holes 31a and 31b sleeved on the linear bearings 30a and 30b, so that the focusing lens groups will be maintained on the correct optical axis of the zoom lens.

Figure 3B:
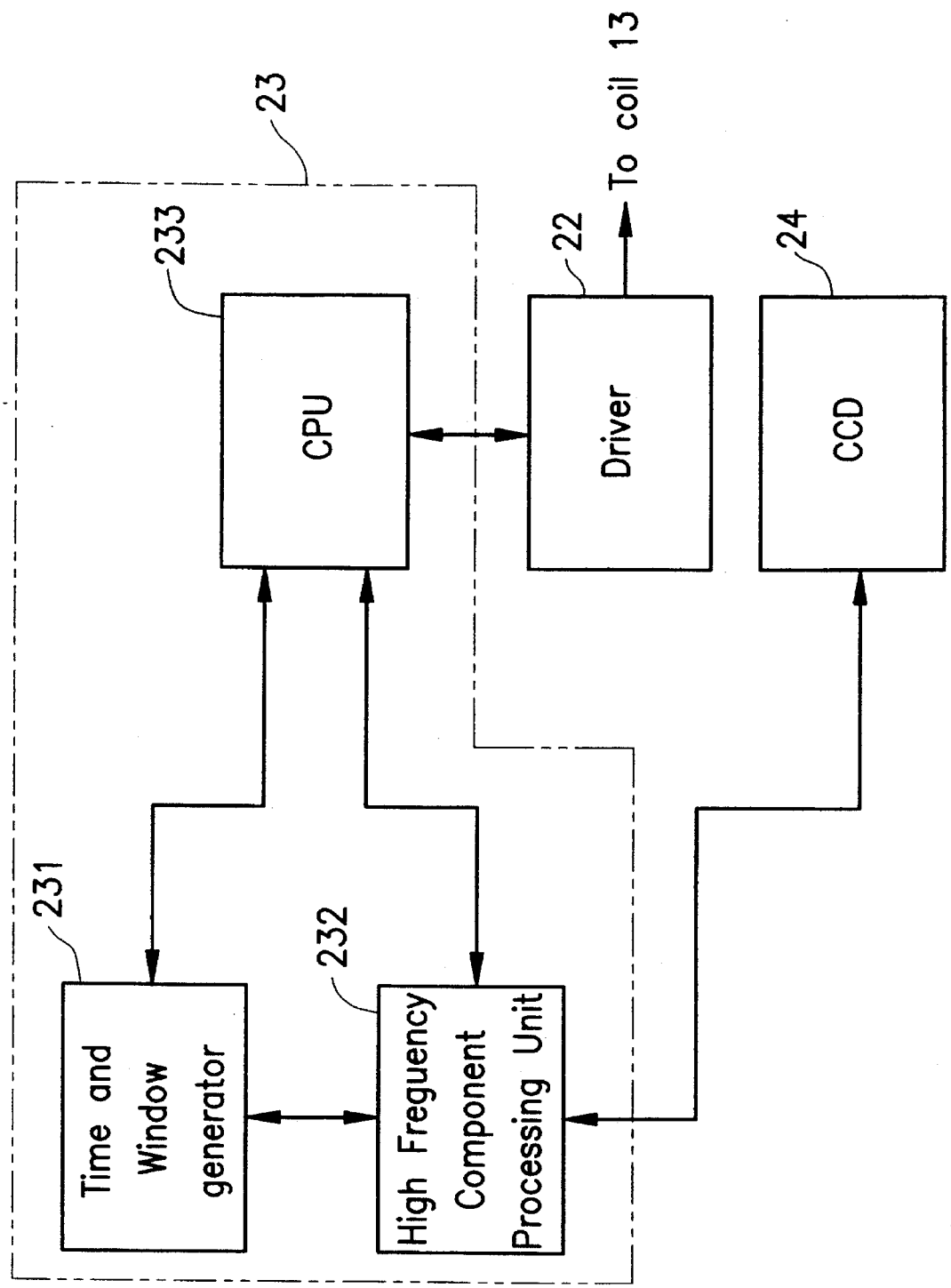
FIG. 3b shows a schematic block diagram of the electric circuit of the driving mechanism according to the present invention.

The focusing circuit includes a position sensor 21, a driver 22, and a focus detecting circuit 23. The driver 22 is connected to the coil 13. The driver 22 can urge the movable portion by inducing a current in the coil 13 according to the principle discussed hereinbefore. The image of an object is projected on CCD 24 as shown in FIG. 3. The data of the image is sent to the focus detecting circuit 23 to decide whether the object is focused according to the contrast of the image, then a position control signal will be sent to the driver 22 to urge the focusing lens groups, to focus the object precisely on the CCD 24. As shown in FIG. 3b, the focus detecting circuit 23 includes a time and windows generator 231, a high frequency component processing unit 232, and a central processing unit 233. IC 68HC05 is used as the central processing unit 233 as shown in FIG. 3b in this embodiment. However, other ICs may also be applicable. The time and windows generator 231 generates timing signals to drive the central processing unit 233 and the high frequency component processing unit 232, and extracts signals in a rectangular matrix from the image data which is brightness signals come from CCD 24, according to a window signal. The high frequency component processing unit 232 receives the image data from the CCD 24, extracts the high frequency component from the image data, obtains a focusing value by integration, and sends the focusing value to the central processing unit 233. The central processing unit 233 determines the position control signal to be sent to the driver 22 by processing the focusing value according to a logic decision program.

Position sensor 21 includes a fixed light source 32, a sheet 20 attached on the lens socket 18, and a fixed photo detector 33 of the same length as the sheet 20. The photo detector 33 converts the light coming from the light source 32 into a voltage signal. Since the sheet 20 moves with the focusing lens socket 18, the position of the focusing lens socket 18 can be easily determined from the strength of the voltage signal of the photo detector 33. The voltage signal is sent to the driver 22 as a position feedback, to make the position of the focusing lens socket more stable.

As stated before, the present invention uses a linear actuating technique, therefore the entire focusing system has no backlash, so that the focusing will be more accurate than conventional driving mechanism. And, since the actuator is directly fixed to the focusing lens socket, the focusing speed will be increased considerably. Furthermore, due to its lack of conversion mechanism and wear, it has a compact size and longer life.

While the invention has been described by way of examples and in terms of a preferred embodiment, it is to be understood that the invention need not be limited to the disclosed embodiment. On the contrary, it is intended to cover various modifications and similar arrangements included within the spirit and scope of the appended claims, the scope of which should be accorded the broadest interpretation so as to encompass all such modifications and similar structures.

What is claimed is:

1. A driving device with linear motion structure for linearly moving and adjusting an inner focus type zoom lens using a CCD to receive an image of an object and generate an image signal, comprising:

a fixed portion including a frame, a cylindrical iron fixed on one side of said frame, a permanent magnet fixed at the center of said iron, a cylindrical pole piece fixed at one end of said permanent magnet, two guide rods fixed on said frame for guiding the lens in a direction of an optical axis of the lens, and said pole piece and said iron forming a gap therebetween where a magnetic field of the magnet passes through;

a movable portion including a lens socket for mounting a focus lens unit to the movable portion for linear movement along the optical axis, a coil socket fixed on said lens socket, and a cylindrical coil sleeved on said coil socket, said lens socket having two holes sleeved on said guide rods for maintaining said focus lens unit aligned with the optical axis during movement along said guide rods, said coil socket surrounding said cylindrical pole piece to cut the magnetic field of the magnet; and a focusing circuit including a coil actuator to drive said coil, and a focus detecting circuit to receive an image from the CCD, output a focus signal to said coil actuator, and output an electrical current to said coil that causes a magnetic field to generate a force to move said focus lens unit linearly along the optical axis.

2. A driving device for an inner focus type zoom lens as claimed in claim 1, wherein said permanent magnet, said cylindrical pole piece and said cylindrical coil are concentric about an axis that is spaced from said optical axis.

3. A driving device for linearly adjusting an inner focus type zoom lens using a CCD to receive an image of an object and general an image signal, comprising:

a fixed portion including a frame, a cylindrical iron fixed on one side of said frame, a permanent magnet fixed at the center of said iron, a cylindrical pole piece fixed at one end of said permanent magnet, two guide rods fixes on said frame for guiding the lens in a direction of an optical axis of the lens, and said pole piece and said iron forming a gap therebetween where a magnetic field of the magnet passes through;

a movable portion including a lens socket for mounting a focus lens unit to the movable portion for linear movement along the optical axis, a coil socket foxed on said lens socket, and a cylindrical coil sleeved on said coil socket, said lens socket having two holes sleeved on said guide rods for maintaining said focus lens unit aligned with the optical axis during movement along said guide rods, said coil socket surrounding said cylindrical pole piece to cut the magnetic field of the magnet;

a focusing circuit including a coil actuator to drive said coil, and a focus detecting circuit to receive an image from the CCD, output a focus signal to said coil actuator, and output an electrical current to said coil that causes magnetic field to generate a force to move said focus lens unit linearly along the optical axis; and a position sensor including a light source, a photo detector fixed on said frame, and a sheet fixed on said lens socket to cover a part of said photo detector, said photo detector converting the energy of the light source into a voltage signal, and outputting the voltage signal to said coil actuator as a position feedback so as to position said focus lens unit stably.

4. A driving device for an inner focus type zoom lens as claimed in claim 3, wherein said permanent magnet, said cylindrical pole piece and said cylindrical coil are concentric about an axis that is spaced from said optical axis.

* * * * *